Patented June 26, 1923.

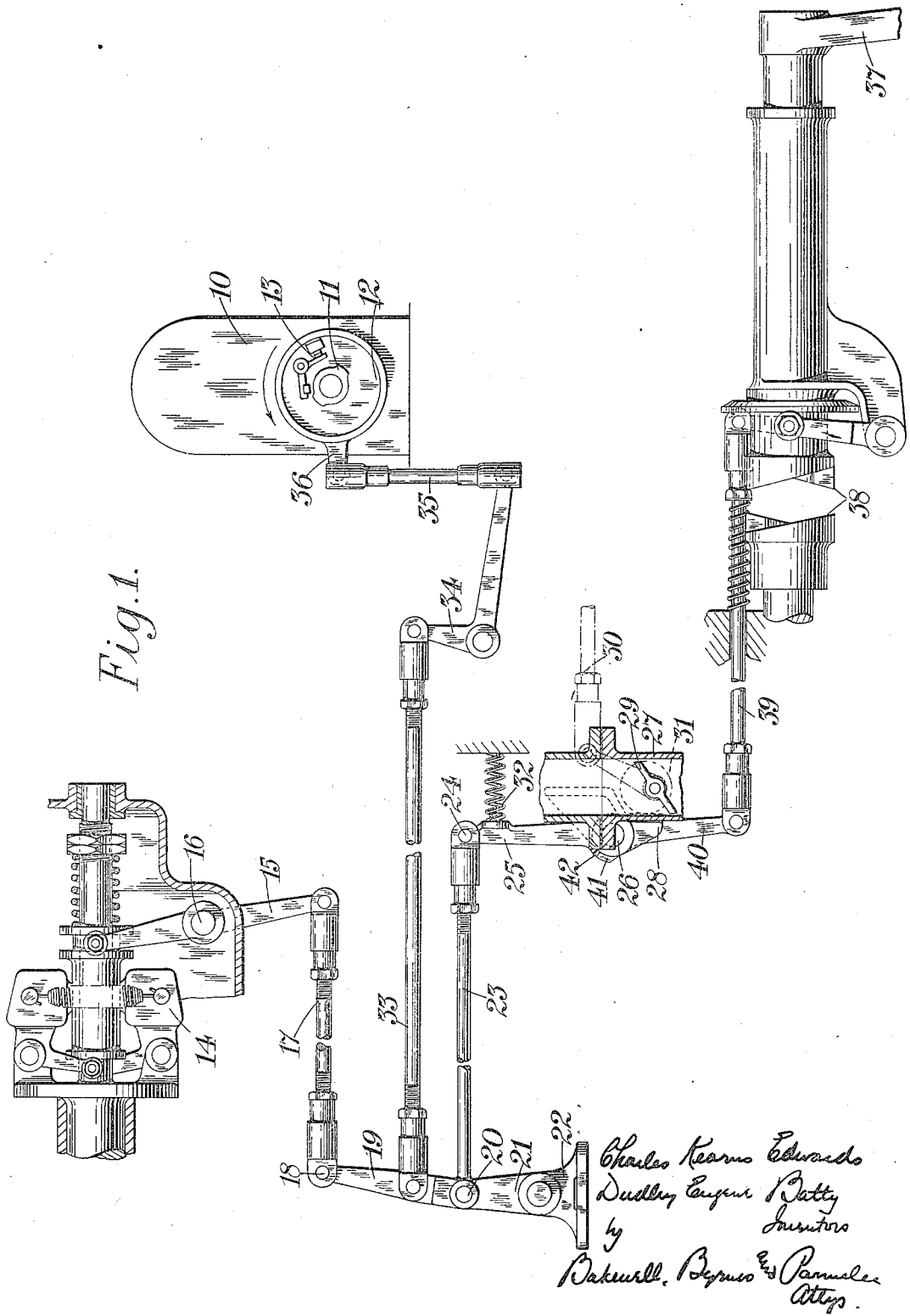

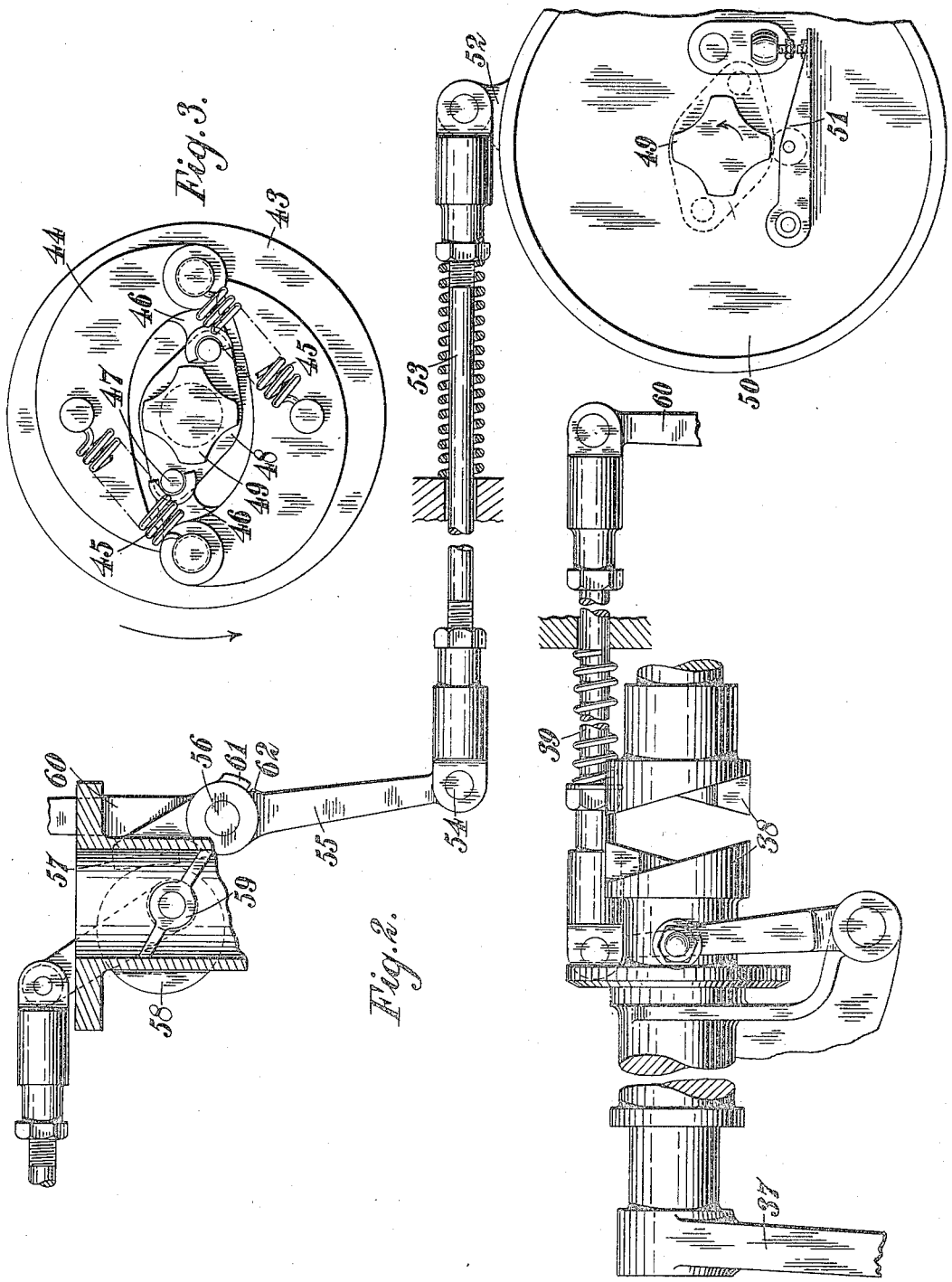

1,460,056

UNITED STATES PATENT OFFICE.

CHARLES KEARNS EDWARDS AND DUDLEY EUGENE BATTY, OF LONDON, ENGLAND, ASSIGNORS TO ASSOCIATED EQUIPMENT COMPANY, LIMITED, OF LONDON, ENGLAND, A BRITISH COMPANY.

AUTOMATIC CONTROLLING MEANS FOR THE IGNITION TIMING IN INTERNAL-COMBUSTION ENGINES.

Application filed July 14, 1921. Serial No. 484,735.

*To all whom it may concern:*

Be it known that we, CHARLES KEARNS EDWARDS, a subject of the King of England, residing at Chingford, London, E. 4, England, and DUDLEY EUGENE BATTY, a subject of the King of England, residing at West Kensington, London, W. 14, England, have invented certain new and useful Improvements in Automatic Controlling Means for the Ignition Timing in Internal-Combustion Engines, of which the following is a specification.

This invention is for improvements in or relating to automatic controlling means for the ignition timing in internal combustion engines, and has for one of its objects to provide for the more efficient automatic control of the timing.

It has been proposed to control the timing according to the speed of the engine, and for this purpose a centrifugal governor has been employed which automatically advances the timing as the engine speed increases and retards it as the engine speed decreases. While the engine speed is an important factor in connection with the timing, it is not the only factor which requires consideration, and therefore devices which only provide for this basis of automatic control do not take into consideration all of the factors necessary to obtain the most efficient control of the timing that is possible.

According to the primary feature of the present invention, there is provided an automatic controlling means for the timing, comprising in combination a member (for example a centrifugal governor) operative according to the changes in the speed of the engine, a member (for example a lever) operative according to changes in the opening of a valve controlling a supply of fluid (for example the explosive mixture) to the engine cylinder, and means for connecting said members to the ignition timing device in such a manner that the timing can be varied by either of said members individually or by both members simultaneously. In most circumstances where automatic control, as distinct from manual control, is desired, it will probably be preferred to connect the second member aforesaid to the throttle, but it is to be understood that the invention is not limited to this, as some other valve, such as, say, one controlling the supply of air, could be employed. Where the throttle valve is so employed, the setting of the members and of their connections to the timing device may conveniently be such that the one member tends to advance the timing as the engine speed increases, and to retard it as the engine speed decreases, and the other member tends to advance the timing as the valve opening decreases and to retard it as the valve opening increases.

In one construction according to the present invention, the ignition timing device is operated by a floating lever connected towards one end to the member which is operative according to the changes in the engine speed, and towards its other end to the member which is operative according to the changes in the opening of the aforesaid valve, and also operatively connected intermediate its ends to the timing device. Thus, either end of the lever may serve as the fulcrum for the lever to be turned about, by one of the members, or in some circumstances the lever may be moved bodily, neither of its ends remaining stationary during the automatic adjustment.

When an engine is being started up, it is desirable that the ignition should be retarded. In case, therefore, that the automatic controlling means may have left the ignition insufficiently retarded at the time that the engine stopped, there may be provided, according to one feature of the present invention, means operated by the starting mechanism for further automatically retarding the ignition. Where a crank handle is employed for starting purposes, which handle is slid longitudinally along its pivot to bring it into operative position, this starting-handle may be connected to the ignition timing device by means which are moved by the starting-handle to adjust the timing device to retard the ignition when the said handle is slid into operative position, if the said timing device is not already sufficiently adjusted into ignition retarding position. In such a construction, a rod attached to the ignition timing device may be connected to the starting-handle of the engine by a lost motion connection. Thus, during running of the engine, the automatic control of the timing may take place unhindered by the connection to the starting-handle, but the latter can become operative when the engine is being started up.

In another construction according to the present invention, the member operative according to changes in the speed of the engine, is connected to the cam of the engine ignition device to adjust the same relatively to the contact breaker it operates, and the member operative according to changes in the opening of the aforesaid valve is connected to the contact breaker to adjust the same relatively to the cam. This construction affords the advantage of compactness since the drive to the cam can be taken through the centrifugal governor or other member operative according to the changes in the speed of the engine, and thus the necessity for having two separate drives, one to the cam and the other to the governor, is avoided.

For a more complete understanding of the invention there will now be described by way of example only and with reference to the accompanying drawings, certain constructional forms of controlling means according to the invention. It is to be understood, however, that the invention is not limited to the precise constructional details set forth.

In these drawings—

Figure 1 is a development, more or less diagrammatic, and partly in section, of one construction of automatic controlling means as applied to an engine in which a magneto is employed for ignition purposes;

Figure 2 is a somewhat similar view of a modified construction showing the invention applied to an engine using coil ignition, and Figure 3 is a view of a centrifugal governor for use in connection with the construction shown in Figure 2.

Referring first of all to Figure 1, a magneto is indicated at 10, its cam 11 being driven in any suitable manner by the engine crank shaft. Co-operating with the cam is a plate 12 carrying the contact breaker 13. The plate 12 is adjustable around the axis of the cam 11 in order to vary the timing of ignition. At 14 there is illustrated one form of centrifugal governor which is coupled to the engine crank shaft to be driven thereby. It controls a lever 15 pivoted at 16 and connected by an adjustable coupling 17 to one end 18 of a floating lever 19. This lever 19 is pivoted at its other end 20 upon an arm 21 swung from a suitable stationary support 22. The end 20 of the lever 19 is connected by an adjustable coupling 23 to the end 24 of a lever 25. This lever 25 is pivoted at 26 adjacent the engine induction pipe 27 and it has an extension 28 which extends below its point of pivoting. Located adjacent the end 28 of the lever 25 is the throttle valve 29 which is operated by the usual control 30. Coupled to the throttle valve 29 to move therewith during its adjustment is a cam or eccentric 31 whereof the edge is adapted to bear against the extension 28 of lever 25. The cam 31 is so shaped and arranged as to turn the lever 25 about its pivot as the throttle opens and to permit the lever to be returned again as the throttle closes through the agency of a spring 32 bearing against the lever 25. Intermediate of its ends, the floating lever 19 is attached by an adjustable coupling 33 to a bell crank lever 34 which is in turn attached by an adjustable coupling 35 to a lug 36 extending from the plate 12. Thus as the speed of the engine varies, the one end of the floating lever 19 will be moved to vary the timing and similarly as the throttle opening is varied, the other end of the floating lever 19 will be moved to vary the timing. If changes occur simultaneously in the engine speed and the throttle opening, then both ends of the floating lever 19 will be moved and the timing adjusted accordingly. It is preferred so to arrange the parts that as the engine speed increases the timing is advanced and vice versa, and as the throttle is opened the timing is retarded and vice versa. This arrangement secures efficient working of the engine since it correlates the timing not only to the engine speed but also to the load. For instance under heavy loads, the engine, being at low gear, might be running fast, and if the timing were only controlled according to the speed of the engine it would be so far advanced as probably to prevent the engine coping with the load, but since under such conditions the throttle would probably be fully open, this will have the effect, in a device according to the present invention, of retarding the timing, which is what is required to obtain satisfactory working in the conditions just stated.

As is well known it is desirable when an engine is being started up that the ignition should be retarded. In order to secure this automatically even though when the engine stopped the setting of the ignition given by the automatic controlling means hereinbefore described was not sufficiently retarded, the controlling means for the ignition is shown in Figure 1 as being also coupled to the starting-handle. The handle is indicated at 37 and it is of the well-known type which has to be moved longitudinally in order that its clutch 38 may become operative. The handle is connected by a spring-controlled adjustable coupling 39 to a lever 40 which is pivoted co-axially with the lever 25. The lever 40 has a projection 41 which is adapted to abut against a projection 42 on the lever 25. Thus when the handle 37 is slid longitudinally preparatory to starting the engine, the lever 40 will be turned to press against the lever 25 and retard the timing through the floating lever 19. It will be appreciated that the connection between the levers 25 and 40 is a lost motion connection. Consequently if the lever 25 is already in such a position under the influence of the cam 31 as to maintain the timing sufficiently retarded, the movement of the lever 40 will be inoperative in this respect.

The invention is applicable to engines having either a magneto or coil ignition and the contact breaker or distributor or other timing device thereof may be connected to the controlling means. Figures 2 and 3 show the invention as applied to an engine working on coil ignition, but it is to be understood that the arrangement shown in Figure 1 may be applied to such an engine, and conversely the arrangement shown in Figures 2 and 3 may be applied to an engine employing a magneto. In the construction shown in Figures 2 and 3, a circular plate 43 receives drive from the engine crank shaft. Pivoted upon it are two crescent-shaped weights 44 which are controlled by springs 45 and which have lugs 46 cut away to receive the ends of pins 47. The pins 47 are carried by a plate 48 coupled to the cam 49. Thus the engine drive is transmitted through the plate 43 to the cam 49, and the position of the cam relatively to the plate 43 is varied automatically according to the engine speed, since as the latter varies the weights 44 will alter their position under centrifugal force and correspondingly adjust the plate 48. In this manner the timing of ignition is correlated to the engine speed. Concentric with the plate 43 is another plate 50 which is similar to the plate 12 and carries a contact breaker 51. This plate 50 has a lug 52 whereby it is attached through an adjustable spring-controlled coupling 53 to one end 54 of a lever 55. This lever 55 corresponds to the lever 25 in the construction shown in Figure 1, and it is pivoted at 56 and has an extension 57 which bears against a cam 58 moving with the throttle valve 59 in a similar manner to that in which the cam 31 moves with the throttle valve 29. By this means, as the throttle opening is varied, the position of the contact breaker 51 relatively to the cam 49 is varied and thus the timing is correlated to the throttle opening. The results already described in connection with the construction shown in Figure 1 are thereby obtained. There is also shown in Figure 2 a lever 60 having a projection 61 which engages a projection 62 on the lever 55 in a similar manner to that in which the projections 41 and 42 engage in the construction shown in Figure 1. This lever 60 is coupled to the starting-handle of the engine for the purpose already described. It will be appreciated that there is provided according to the present invention a means of positively or automatically controlling the ignition so that it shall occur at the most advantageous time under all conditions of speed and load. The precise constructional details hereinbefore specified are not essential to the present invention, and may be modified without departing from the spirit and scope thereof. For example instead of the floating lever hereinbefore described some other form of differential lever or other equivalent motion may be employed.

What we claim as our invention and desire to secure by Letters Patent is:—

1. In an internal combustion engine, the combination with an ignition timing device, a valve controlling a supply of fluid to the engine cylinder, and a member operative according to changes in the speed of the engine, of a cam operatively connected with said valve and adjusted simultaneously with the same, said cam being shaped to suit the particular characteristics of the engine, and spring controlled means connected with said ignition timing device and arranged to be actuated by said cam and by said member in such a manner that the ignition timing device can be regulated according to changes in the speed of the engine and to changes in the supply of fluid to the engine.

2. In an internal combustion engine, the combination with an ignition timing device, a valve controlling a supply of fluid to the engine cylinder, and a member operative according to changes in speed of the engine, of a cam operatively connected with said valve and adjusted simultaneously with the same, said cam being shaped to suit the particular characteristics of the engine, spring controlled means for regulating said ignition timing device, said means comprising a member controlled by said cam, a floating lever connected towards one end with the said member controlled by said cam, means connecting the floating lever towards its other end with said member and being operative according to changes in the speed of the engine, and means connecting the floating member between its ends to the ignition timing device.

3. In an internal combustion engine, the combination with an ignition timing device, a valve controlling a supply of fluid to the engine cylinder, and a governor operative according to changes in the speed of the engine, of a cam operatively connected with said valve and adjusted simultaneously with the same, said cam being shaped to suit the particular characteristics of the engine, spring controlled means for regulating said ignition timing device, said means comprising a lever having one end controlled by said cam, a floating lever having one end connected with the other end of the first said lever, means operatively connecting the other end of the floating lever with said governor, and means connecting the floating lever between its ends to the ignition timing device.

4. In an internal combustion engine, the combination of an ignition timing device, a spindle, a rotary valve fixed on said spindle and controlling a supply of fluid to the engine cylinder, a cam fixed on said spindle and shaped to suit the particular characteristics of the engine, and spring controlled means connected with said ignition timing device and arranged to be actuated by said cam, whereby the timing device can be regulated in accordance with changes in the supply of fluid to the engine.

5. In an internal combustion engine, the combination with an ignition timing device, a valve controlling a supply of fluid to the engine cylinder, a cam operatively connected with said valve and adjusted simultaneously with the same, said cam being shaped to suit the particular characteristics of the engine, spring controlled means connected with said ignition timing device and arranged to be actuated by said cam whereby the timing device can be regulated in accordance with changes in the supply of fluid to the engine, starting mechanism for the engine, and means operatively connecting the starting mechanism with said spring controlled means adapted to adjust the timing device to retard the ignition when the starting mechanism is actuated.

In testimony whereof we have signed our names to this specification in the presence of two subscribing witnesses.

CHARLES KEARNS EDWARDS.
DUDLEY EUGENE BATTY.

Witnesses:
ARTHUR ABBEY,
HAROLD H. SIMMONS.